United States Patent
Welsh

[15] 3,673,310
[45] June 27, 1972

[54] ELECTRICAL UTILITY BOX

[72] Inventor: Robert Louis Welsh, Cherry Hill, N.J.
[73] Assignee: Omark Industries, Inc., Portland, Oreg.
[22] Filed: Dec. 4, 1969
[21] Appl. No.: 882,046

[52] U.S. Cl. ............................174/58, 220/3.3, 248/DIG. 6
[51] Int. Cl. ..........................................................H02g 3/08
[58] Field of Search ...................174/58, 53, 48, 49; 220/3.3, 220/3.2, 3.9, 18; 248/216

[56] References Cited

UNITED STATES PATENTS 2,461,145  2/1949  Craver.................................248/216

Primary Examiner—Lewis H. Myers
Assistant Examiner—D. A. Tone
Attorney—Charles F. Duffield

[57] ABSTRACT

A metallic utility box adapted to be secured to metallic walls. A first end weldable stud is welded to the back of the box and a second end weldable stud is welded by the stud welding technique to the metallic wall at the desired location of the box. Mating thread means on the projecting ends of the first and second studs permit the utility box to be secured in place by threading the studs together. Electrical conduit is secured to the box to prevent the box from rotating and consequently becoming unsecured from the wall.

1 Claim, 2 Drawing Figures

Patented June 27, 1972
3,673,310
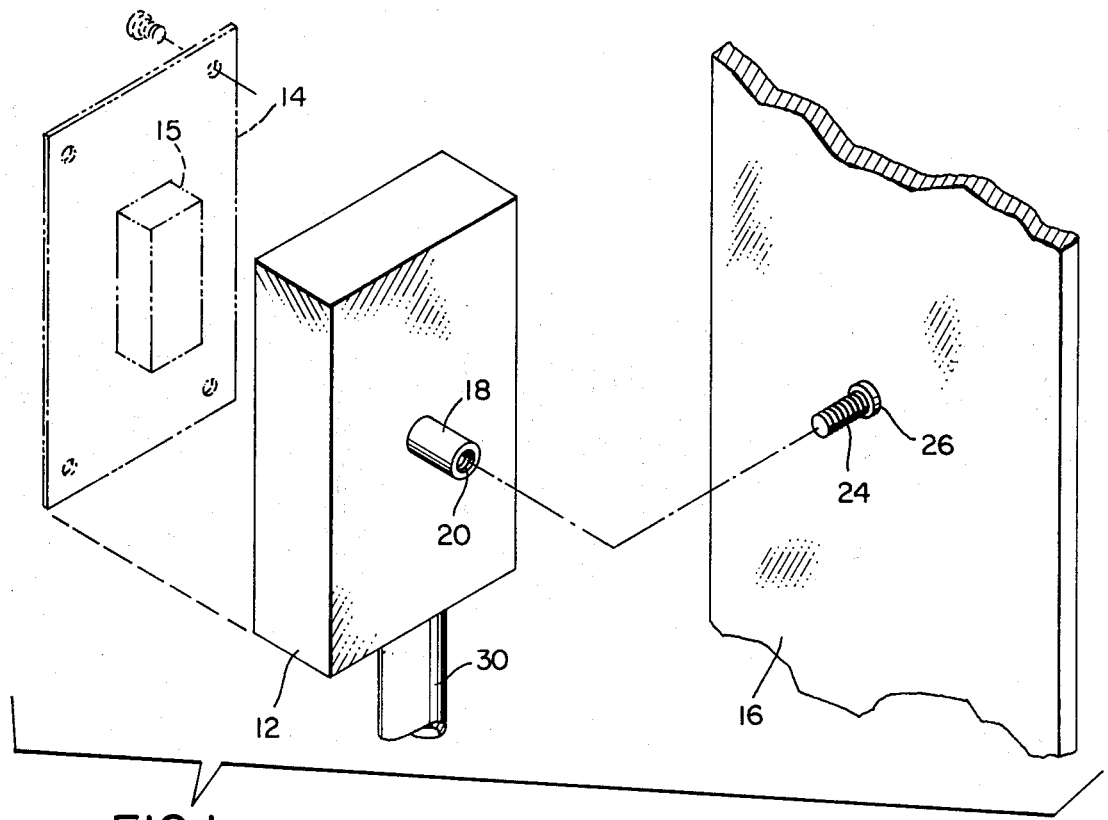
FIG. I
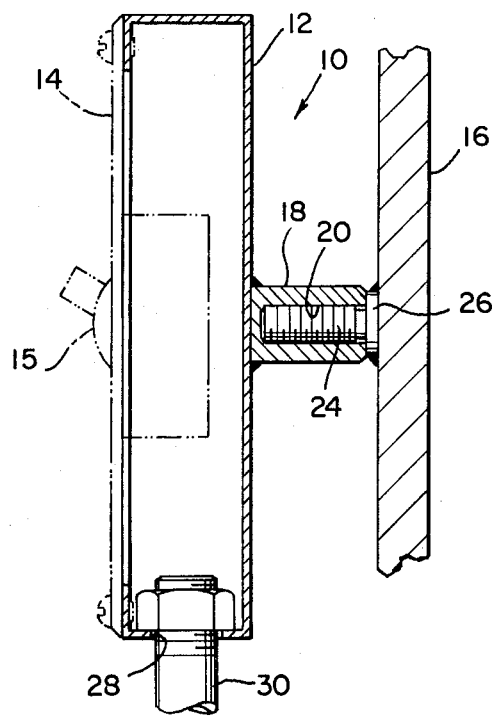
FIG. 2
INVENTOR.
ROBERT L. WELSH
BY
Charles F. Duffield
ATTORNEY.

ELECTRICAL UTILITY BOX

SUMMARY AND OBJECTS OF INVENTION

The present invention is concerned with mounting of electrical utility boxs to metallic walls such as the walls of ships and the like.

Mounting of electrical utility boxs to metallic walls such as the bulkheads of ships or metal partition walls in buildings has always presented a problem. The most common way of mounting the metallic utility boxs to the metal walls is to drill holes through the utility box and the wall and secure the utility box by means of a nut and bolt arrangement. Such an installation is time consuming and expensive.

The utility box arrangement of the present invention eliminates the need for drilling the holes in the box and the metallic wall. In accordance with the present invention, a first end weldable stud is welded to the back of the utility box and a second stud is welded to the metallic wall at the location at which the utility box is to be mounted. The ends of each of the studs have cooperating threading means which will permit the utility box to be threaded into place on the wall. Electrical conduit is secured to the utility box to prevent the utility box from turning resulting in unthreading of the studs.

It is, accordingly, an object of the present invention to provide a quick and inexpensive means of mounting a metallic utility box to a metallic wall by means of mating threaded studs welded to the back of the utility box and to the metallic wall to which it is to be attached.

It is also an object of the present invention to lock the utility box in place by means of electrical conduit secured to the utility box.

Other objects and advantages of the present invention will become apparent from the detailed description thereof which follows.

DESCRIPTION OF DRAWING

FIG. 1 is an exploded isometric view of the utility box and mounting arrangement of the present invention; and FIG. 2 is a side elevation in section of the utility box of the present invention when mounted to the metallic wall.

DETAILED DESCRIPTION OF INVENTION

The utility box mounting arrangement of the present invention is shown in FIGS. 1 and 2 of the drawing. The utility box 12 may be of the type suitable for housing a light switch 15 secured to a cover plate 14 for the box or for any other electrical facility such as an outlet plug.

A first elongate end weldable stud 18 is welded centrally on the back portion of the utility box 12 by means of the stud welding technique. The stud 18 is welded to project perpendicularly from the back of the box. In the embodiment shown, the stud 18 includes a bore 20 therein which is internally threaded.

A second elongate end weldable stud 24 is simarily welded to the metallic wall 16 by means of the stud welding technique. The projecting end of the stud 24 includes external threads thereon which are adapted to mate with the internal threads of the stud 18.

As may be seen in FIG. 2, after the studs on the box and the wall are in place, the utility box may be secured in place by threading the stud 18 over the stud 24 until the end of the stud 18 engages the wall 16.

After the utility box is secured in place, electrical conduit 30 is secured to the utility box through knock-outs 28 in a conventional and well known manner. The electrical conduit 30 functions to secure the box against rotation and consequent unthreading of the mating stud members.

The foregoing utility box mounting arrangement provides a rigid mounting of the utility box to the metallic wall. This arrangement can be quickly and inexpensively effected by means of the welding of the two studs. The present arrangement eliminates the necessity for marking and drilling holes through the box and metallic wall as has been necessary in the past.

Various modifications of the above described embodiment of the invention will be apparent to those skilled in the art, and it is to be understood that such modifications can be made without departing from the scope of the invention, if they are within the spirit and tenor of the accompanying claims.

What is claimed is:

1. In combination, a metallic electrical utility box having a backing member and deep wall portions with at least one conduit aperture through a wall portion, a metallic wall to which the utility box is to be mounted, an internally threaded end weldable stud having one enclosed end and welded substantially perpendicularly at said enclosed end to the backing member of the utility box by the stud end welding technique, an elongate externally threaded end weldable stud of length equal to or greater than the internally threaded stud, welded at one end to the metal wall by the stud end welding technique and extending substantially perpendicularly from the metallic wall, said internally threaded stud being threaded upon the opposite end of the externally threaded stud to support the utility box at any angle and spaced distance from the wall depending upon the length of externally threaded stud chosen and thread engagement, and at least one rigid electrical conduit secured to the utility box through the conduit apertures to secure the utility box against rotation.

* * * * *